April 1, 1952 L. BURGESS 2,591,132
COFFEE MAKER
Original Filed July 12, 1947 10 Sheets-Sheet 1

Fig. 1

INVENTOR
Louis Burgess

April 1, 1952     L. BURGESS     2,591,132
COFFEE MAKER
Original Filed July 12, 1947     10 Sheets-Sheet 2

INVENTOR
Louis Burgess

April 1, 1952      L. BURGESS      2,591,132
COFFEE MAKER Original Filed July 12, 1947      10 Sheets-Sheet 3

INVENTOR
Louis Burgess

April 1, 1952

L. BURGESS

2,591,132

COFFEE MAKER

Original Filed July 12, 1947

INVENTOR
Louis Burgess

April 1, 1952     L. BURGESS     2,591,132
COFFEE MAKER
Original Filed July 12, 1947     10 Sheets-Sheet 6

INVENTOR
Louis Burgess

April 1, 1952  L. BURGESS  2,591,132
COFFEE MAKER

Original Filed July 12, 1947  10 Sheets-Sheet 7

INVENTOR
Louis Burgess

April 1, 1952  L. BURGESS  2,591,132
COFFEE MAKER

Original Filed July 12, 1947  10 Sheets-Sheet 8

INVENTOR
Louis Burgess

Patented Apr. 1, 1952

2,591,132

UNITED STATES PATENT OFFICE 2,591,132

COFFEE MAKER

Louis Burgess, Jersey City, N. J.

Original application July 12, 1947, Serial No. 760,599. Divided and this application October 28, 1949, Serial No. 124,063

6 Claims. (Cl. 99—283)

1

The present invention is an improvement upon the coffee maker described in my U. S. Patent 2,149,270 of March 7, 1939, and is a division of my copending application, Serial No. 760,599, filed July 12, 1947.

The machine shown and described in my said prior patent in the complete form in which it is adapted for restaurant and similar use includes the following:

A. A tank from which a predetermined amount of hot water is extracted whenever the machine is operated. The water in this tank is automatically maintained at a predetermined level by a float control inlet valve and this water is automatically maintained at boiling temperature by a thermostatically controlled heating device.

B. A dispenser which delivers a predetermined amount of ground roasted coffee when the machine is operated.

C. A receptacle into which said coffee and said water are introduced and in which they are mixed.

D. An imperforate self-dumping overflow type centrifuge into which the mixture of coffee and water flows from said receptacle and in which the mixture is separated into a clarified coffee beverage which overflows the upper lip or rim of the centrifuge and a residue of coffee grounds which is ejected from said centrifuge after said centrifuge has stopped.

E. A collector ring encircling the overflow lip or rim of the centrifuge by which the clarified coffee beverage is collected and from which it is conducted to a suitable receptacle.

F. An automatic timing device whereby the steps involved in the operation of the machine are carried through in sequence whenever the machine is set in operation.

The improvements to this machine constituting the present invention will be fully understood from the following description read in conjunction with the drawing in which:

2

Figs. 26, 27, 28, 29, 30, 32 and 35 are detail views showing corresponding positions of a number of cams which are part of the timing device shown in Figs. 20–24 inc.;

Fig. 31 is a top view of part of the showing of Fig. 30;

Fig. 33 is a left side view of part of the showing of Fig. 32;

Figure 1:
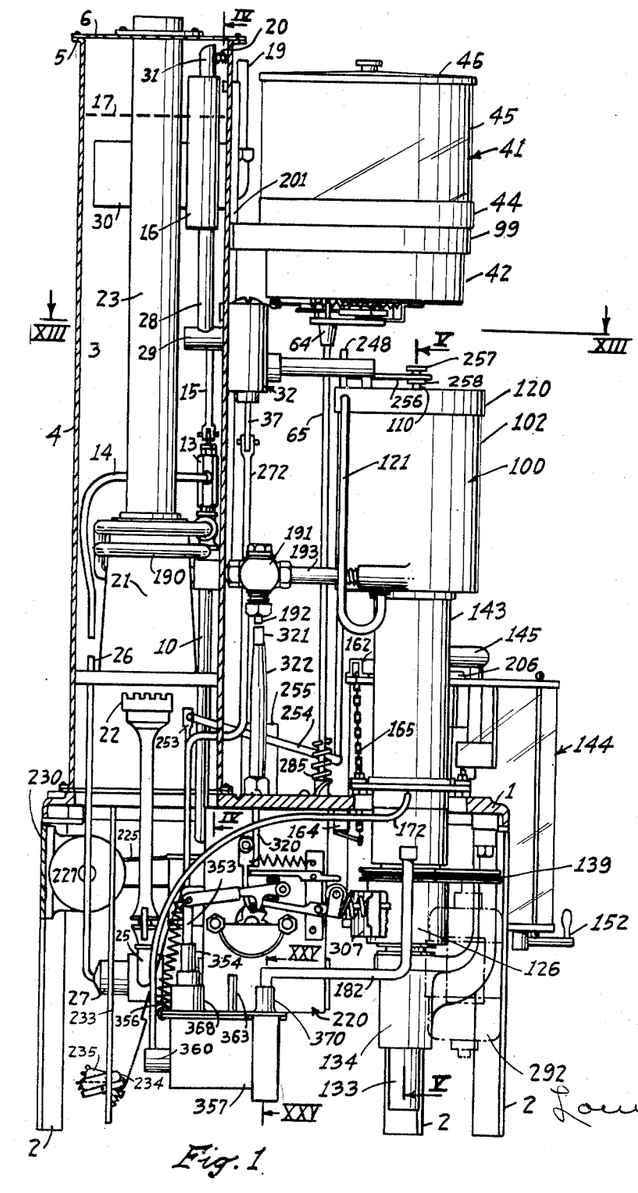
Fig. 1 is a side elevation of my improved coffee maker, with certain parts in section.
Figure 4:
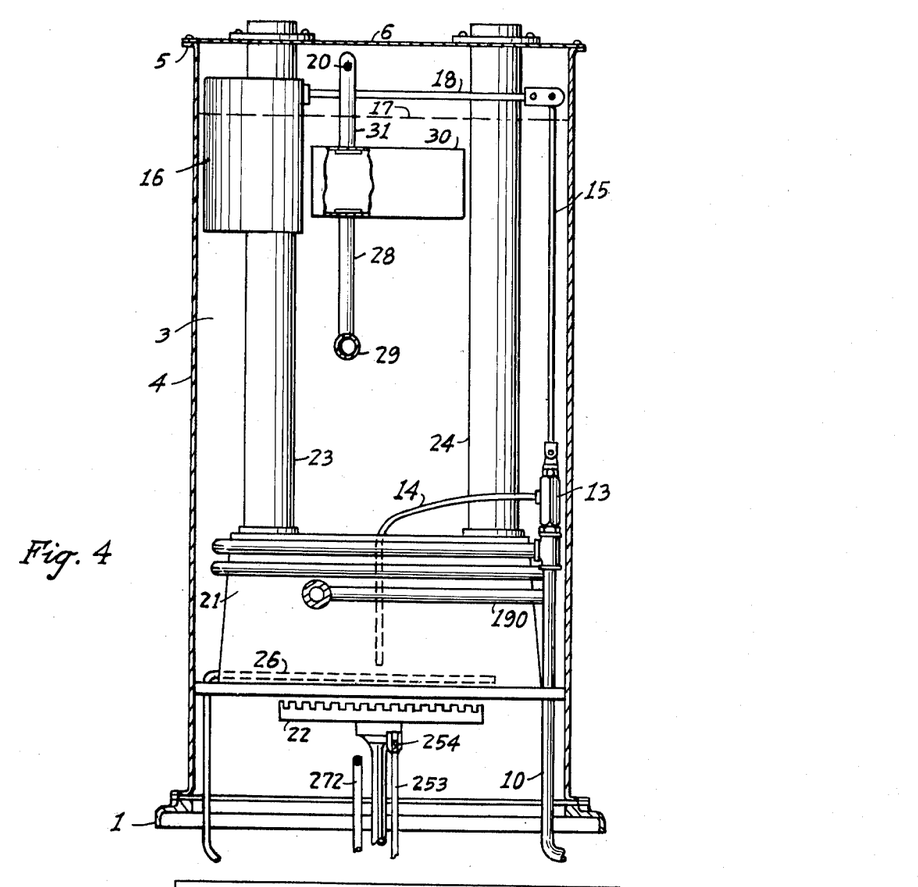
Fig. 4 is a vertical section along the plane IV—IV of Fig. 1.

The parts of the machine are assembled on base 1 (Figs. 1, 2, 4 and 5) supported by suitable legs 2. Tank 3 is mounted on one end of this base and comprises vertical shell 4 carrying at its upper edge flange 5 to which cover 6 is detachably secured by screws. Water enters the tank through pipe 10 (Figs. 1 and 2) communicating with a water pressure source (not shown in the drawing). Flow into the interior of the tank is controlled by needle valve 13 (Figs. 1, 2, 4 and 13) discharging into tube 14. The operation of valve 13 is controlled by float 16 operating through arm 18 and push rod 15 in such a manner that this valve is closed when the level of water in the tank reaches a predetermined level indicated by 17 (Figs. 1 and 4). Water level gauge glass 19 (Fig. 1) communicating at top with the open atmosphere provides convenient means to check this level. Whenever water is withdrawn from the tank, float 16 falls slightly, push rod 15 is thereby raised and water flows into the tank from tube 14 via pipe 18 until the predetermined level 17 is reached. Chamber 21 is open at the bottom to receive heat from burner 22 (Figs. 1 and 4) and at its top communicates with identical stacks 23 and 24 (Figs. 1, 2, 4 and 13). The function of chamber 21 is to transfer the heat delevered by burner 22 to the water in the tank, while stacks 23 and 24 carry off the gaseous combustion products of the burner. Burner 22 receives gas through pipe 25 (Fig. 1). The amount of gas is controlled by bulb or thermally responsive element 26 located in the lower part of tank 3 directly under the outlet of cold water admission tube 14 and operating through thermostat 27 (Fig. 1) so that whenever cold water is admitted into tank 3 or the water in the bottom of said tank otherwise falls below the boiling point, the burner flame increases. The dimensions of identical stacks 23 and 24 are such that enough heat is communicated to the water in the upper part of the tank to keep it at the boiling temperature even though the water in the lower part of the tank is temporarily below the boiling point. This insures that some steam will be continuously generated in the upper part of tank 3, the use and application of which will be described hereinafter. When the water in the lower part of tank 3 is at the boiling point thermostat 27 (Fig. 1) cuts down the burner flame. The bypass of thermostat 27 is adjusted for minimum flame, such that even when the burner is cut down the necessary extent of boiling and steam evolution in the upper part of tank 3 will be maintained.

Figure 2:
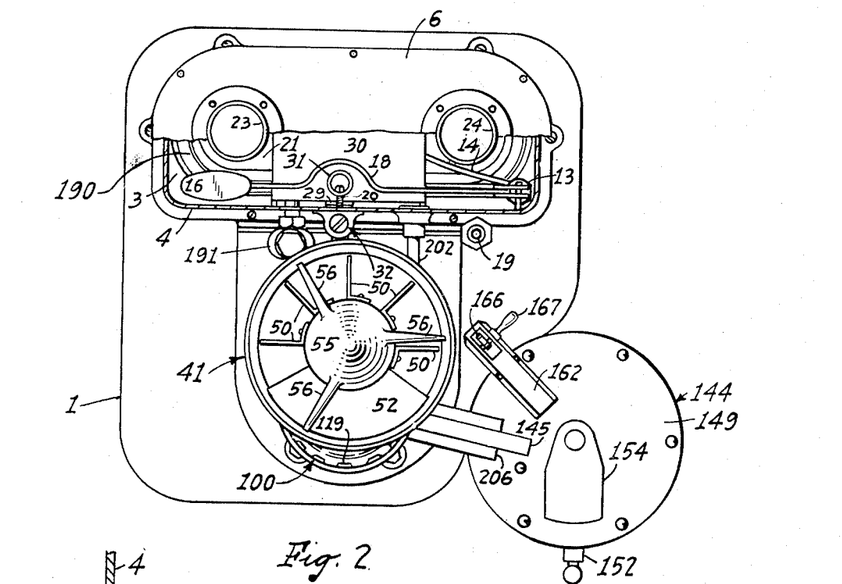
Fig. 2 is a plan view thereof, with certain parts removed.
Figure 3:
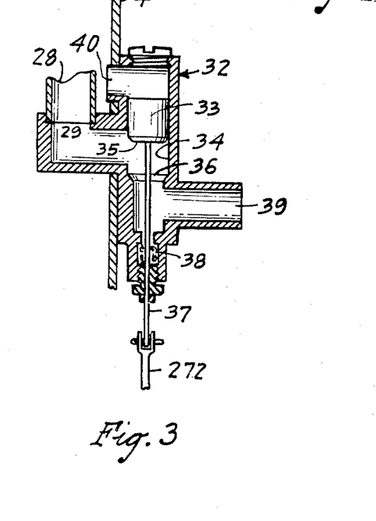
Fig. 3 is a cross-section through a detail of construction.

Up to this point the means described is for the purpose of maintaining a volume of water in tank 3, of maintaining at least the upper part of this water at boiling temperature, and of maintaining controlled evolution of steam therefrom. In the operation of the machine, a predetermined amount of water is abstracted from the upper part of tank 3 when the machine is operated. The equipment for this purpose includes container 30 (Figs. 1, 2 and 4) located in the upper part of tank 3 below water level 17 and vented into the space above said water level 17 by pipe 31. Screw 29 secures pipe 31 to shell 4 of tank 3 (Fig. 2). Details of the mechanism by which container 30 is alternately filled from tank 3 or discharged to a point external to said tank appear from Figs. 1, 3 and 4. This comprises pipe 28 extending at one end into container 30 (Figs. 1 and 4) and at the other end into extension 29 of valve 32. The plunger 33 of said valve is of the combination slide and poppet type, the side wall fitting snugly bore 34 of valve 32 (Fig. 3), while the frustro-conical surface 35 makes liquid-tight contact with frustro-conical seat 36. The plunger is actuated by push rod 37 operating through stuffing box 38. When the plunger is in the position shown in Fig. 3, container 30 (Figs. 2 and 4) is in free communication, via pipe 28, with outlet 39 and the contents of container 30 flow out of tank 3. When, however, plunger 33 is in its lowest position, outlet 39 is blocked by the poppet valve consisting of surface 35 and seat 36, now in liquid-tight contact, whereupon water flows from the interior of tank 3 through port 40 (Figs. 1 and 3) and through the bore 34 of valve 32 back into container 30.

Figure 17:
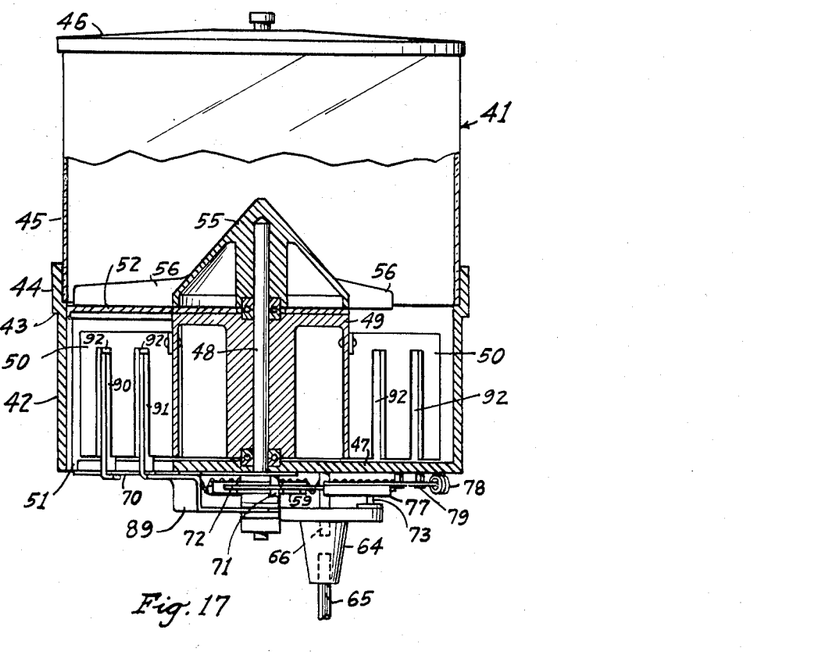
Fig. 17 is a view partly in diametral section of the dispenser shown in Fig. 1.
Figures 18, 19:
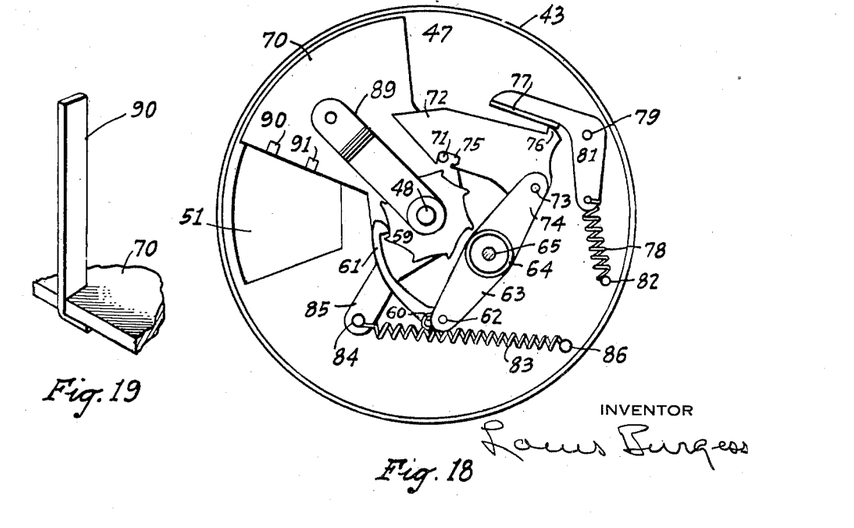
Fig. 18 is a full bottom view of the showing of Fig. 17.
Fig. 19 is a perspective view of part of the showing of Fig. 17.

The dispenser 41 which delivers a predetermined amount of ground roasted coffee is illustrated in Figs. 1, 2, 17 and 18. The dispenser comprises cylindrical bore 42 and integral therewith flange 43 and rim 44 which hold glass cylinder 45. The cylinder is surmounted by the removable cover 46. The bottom of cylindrical bore 42 is provided with floor 47. Upstanding shaft 48 is journaled in the exact center of this floor. Pinned to this shaft is hub 49 which carries eight radially disposed vanes 50 (Figs. 2 and 17). These vanes define eight pockets (Fig. 2) which by their rotational movement operate to progressively bring charges of coffee over discharge port 51 in floor 47 (Fig. 18). Cover plate 52 (Figs. 2 and 17) secured to cylindrical bore 42 (Fig. 17) overlays port 51 to prevent coffee from running out of said port (Fig. 18) except as transported by vanes 50 to a position overlaying said port. To the upper part of shaft 48 there is pinned hub 55 (Figs. 2 and 17) bearing three sweeps 56 which sweep the upper surface of cover plate 52 to prevent accumulation of ground coffee thereon.

Dispenser 41 additionally requires some means for moving hub 49 and attached vanes 50. This means includes gear 59 (Figs. 17 and 18) splined to the lower end of shaft 48. This gear is periodically engaged by a hook 61 journaled at 62 to arm 63 of bracket 64. Spring 60 (Fig. 17) serves to impel said hook into contact with said gear. Bracket 64 borne by vertical shaft 65 is bored to loosely engage stub 66 secured in and depending from floor 47 of the dispenser. As is evident from this construction, when shaft 65 and bracket 64 carried thereby are moved in one direction, hub 49 will be carried through a fraction of a complete revolution, but when shaft 65 and therewith bracket 64 move in the reverse direction, hook 61 will merely slide over the beveled teeth of gear 59 (Fig. 18) without moving hub 49 (Fig. 17). In practice, I find it highly advisable that this movement be carried out gradually and progressively throughout the major part of the operating cycle of the machine. This being the case, it is evident that unless suitable provision were made, the coffee in the pocket, formed by two of vanes 50, moving over discharge port 51 (Figs. 2, 17 and 18) would fall continuously out through said discharge port. Inasmuch as the coffee must however be discharged at the commencement of the operating cycle, suitable means is incorporated to hold this charge of coffee in the dispenser until required. This means includes plate 70 (Figs. 6 and 7) pivoting about shaft 48 and slidable parallel to discharge port 51 to uncover same. Hook 72 is journaled at 73 to arm 74 of horizontal bracket 64. When hook 61 reaches the position of maximum advance, the pocket defined by two of vanes 50 has been brought directly over discharge port 51. At this time slot 75 of hook 72 engages pin 71 on plate 70 and when horizontal bracket 64 and hook 72 actuated thereby move in the reverse direction plate 70 slides to uncover discharge port 51. This uncovering is effected at a suitable time in the beginning of the machine's cycle as will be hereinafter explained. When bracket 64 commences to return, shoulder 76 (Fig. 18) of hook 72 is engaged by dog 77 resiliently pivotal about pin 79 against the action of spring 78 one end of which is connected to arm 81 of dog 77 and the other to stub 82 provided on the bottom of floor 47. Hook 72 is thereby forced out of engagement with pin 71 and plate 70 returns to closed position, covering port 51, under the influence of spring 83, one end of which is connected to pin 84 on arm 85 of plate 70 while the other end is connected to stud 86 protruding downward from dispenser floor 47. The further movement of bracket 64 forces dog 77 out of engagement with shoulder 76, thereby freeing hook 72. Plate 70 is supported by rigid bar 89 pivotally carried by the lower end of shaft 48.

Some of the finer grades of coffee manifest a tendency to stick together and may for this reason not be completely discharged from the space overlaying port 51 even though plate 70 has uncovered said port. This difficulty is, however, overcome by upwardly projecting teeth 90 and 91 (Fig. 17) carried by plate 70, which teeth project up into the space traversed by vanes 50 and rip and dislodge the coffee above discharge port 51 so that it is fully discharged. A perspective view of one such tooth is shown in Fig. 19. As is evident from Fig. 6, vanes 50 define slots or cutout portions 92 which enable vanes 50 to clear teeth 90, 91 in their progressive rotational movement.

The dispenser 41 is positioned by bracket 99 (Fig. 1) embracing cylindrical bore 42 of dispenser 41, the ends of said bracket 99 being secured to shell 4 of tank 3 (Fig. 1). The dispenser is thus firmly secured in position in the machine.

Figures 5, 6, 7, 8, 9, 10, 11, 12:
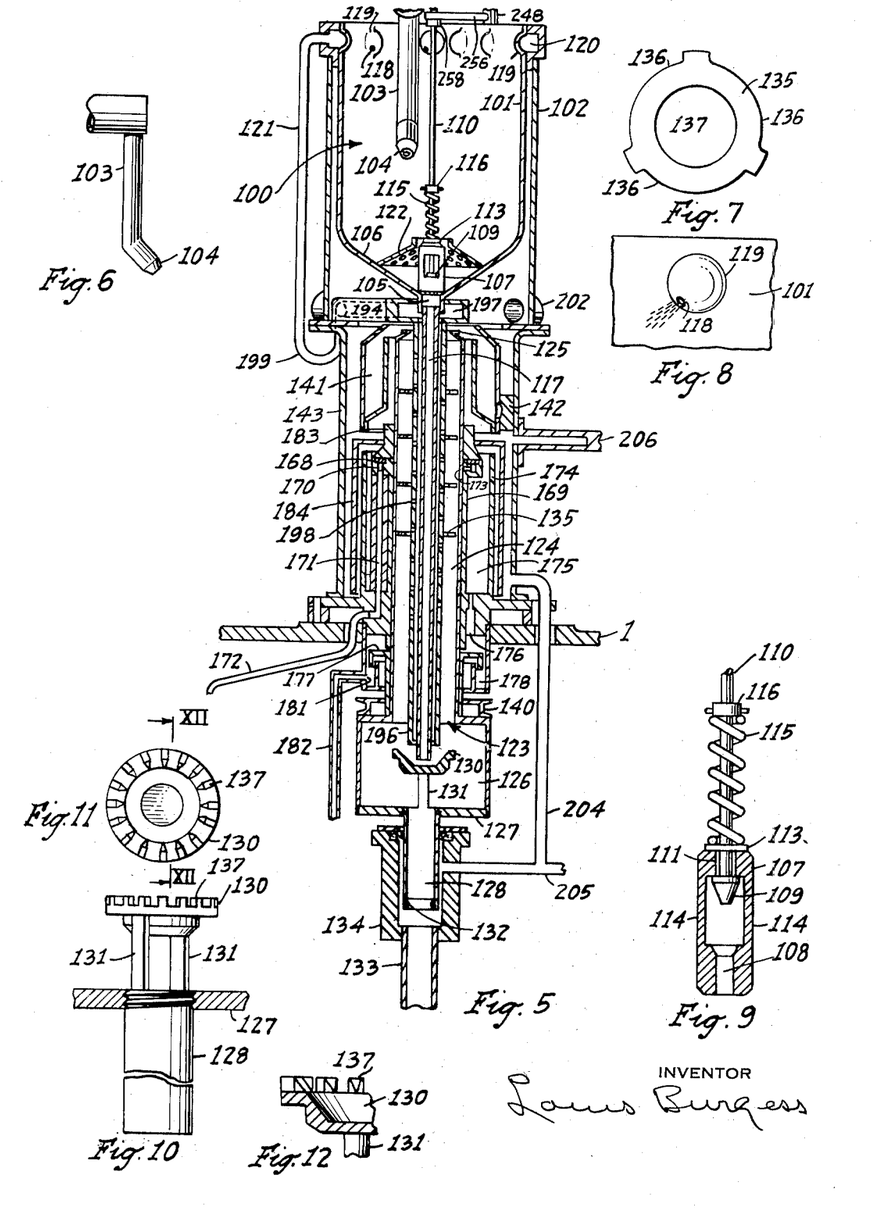
Fig. 5 is a vertical section along plane V—V of Fig. 1.
Figs. 6, 7, 8 and 9 are various detail views of parts of the construction shown in Fig. 5.
Fig. 10 is a side view of a part of the construction shown in Fig. 5.
Fig. 11 is a plan view of the showing of Fig. 10.
Fig. 12 is a broken cross-sectional view along plane XII—XII of Fig. 11.
Figures 13, 16:
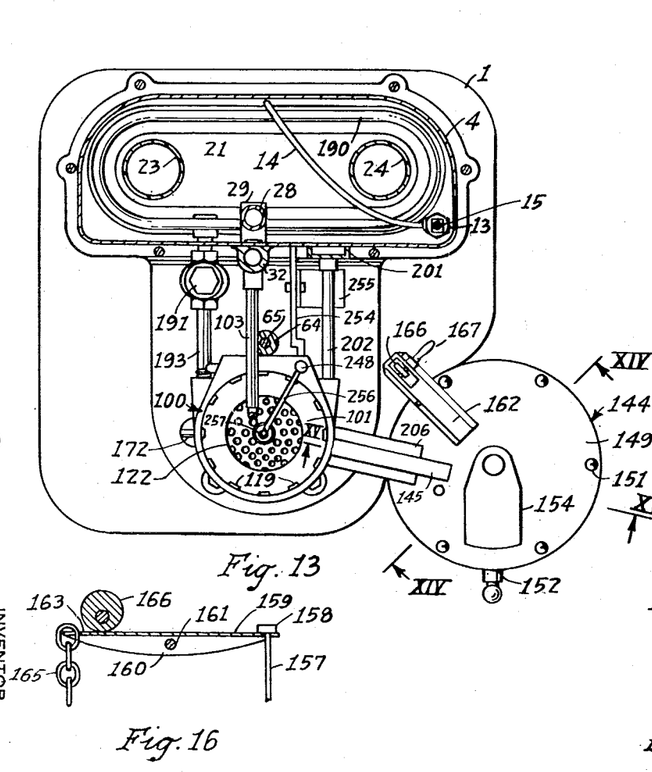
Fig. 13 is a horizontal section along plane XIII—XIII of Fig. 1.
Fig. 16 is a sectional view showing a detail of construction.

That part of the machine by which the predetermined volume of coffee delivered by dispenser 41 and the predetermined volume of water abstracted from tank 3 are commingled to form a mixture of hot water and ground roasted coffee appears in Figs. 1, 5 and 13. Referring to these figures, this part of the device comprises mixer 100 consisting of cone bottom receptacle 101 surrounded by casing 102 and associated means for admixing the coffee and water. Discharge outlet 51 of the dispenser is located directly above the mouth of receptacle 101 so that the charge of ground roasted coffee delivered by the dispenser falls directly into said receptacle. The predetermined volume of water abstracted from tank 3 by means hereinabove described is delivered via valve 32 into receptacle 101 by spout 103 (Figs. 1, 5, 6 and 13). The hot water issues from spout 103 in a well defined stream of considerable velocity through orifice 104 (Figs. 5 and 6). This orifice may be threaded to the spout so that orifices of different capacity may be substituted for one another if it is desired to change the volumetric capacity of the machine. As indicated in the drawing (Figs. 5, 6 and 13) this stream from orifice 104 is discharged at a noncentral angle intermediate between vertical and horizontal and on striking the surface of the liquid already delivered into receptacle 101 it imparts a rotational movement thereto while simultaneously beating down into the liquid any ground coffee floating on the surface thereof. This angle is preferably between 30° and 60° with reference to the horizontal, for maximum efficiency. As a result the coffee and water introduced into receptacle 101 are thoroughly and efficiently commingled by the velocity of the water introduced and without resort to a mechanical mixing device.

Suitable means is provided for discharging the mixture from receptacle 101 after it has remained in the receptacle a suitable predetermined period of time. This means comprises a valve of special and novel construction (Figs. 5 and 9). The mixer discharge outlet 105 is centrally located in the cone bottom 106 of receptacle 101 (Fig. 5). This outlet may be closed by the frustro-conical end of poppet-type plug 107. Referring to Figure 9, it can be noted that plug 107 in turn defines a small outlet or discharge orifice 108 which may be closed by conical plug 109 secured to the lower end of push rod 110. These parts are held in alignment by bore 111 formed in the upper end of plug 107 in which bore push rod 110 reciprocates. The central portion of said plug 107 is cut away leaving only two posts 114, thus permitting free access of the mixture of water and coffee to orifice 108. When the valve is in the position illustrated in Fig. 5, i. e., with push rod 110 in depressed condition, discharge outlet 105 is blocked by plug 107 and orifice 108 is blocked by plug 109. In this position the mixture of coffee and water is of course held in receptacle 101. At the expiration of a predetermined period of time a controlled and uniform stream of the mixture is supplied to the centrifugal separator to be hereinafter more fully described. For this purpose, the pressure on push rod 110 is released whereupon spring 115 pressing against collar 116 pinned to rod 110 forces upwardly said rod and plug 109 carried thereby, thereby uncovering orifice 108. This position of the valve is shown in Fig. 9. The diameter of this orifice and of the rundown tube 117 (Fig. 5) are interrelated. If the rundown tube is too small the requisite rate of flow cannot of course be maintained and conversely if it be too large it will not carry a solid column of liquid, whereupon suction on orifice 108 will be lost and the rate of flow out of receptacle 101 will fall off rapidly with diminishing level of the material in receptacle 101. Within these limits the rate of flow from receptacle 101 is a function of the total heighth of liquid in said receptacle and said rundown tube 117 and is therefore only limitedly affected by the drop in level in receptacle 101.

For the purpose of establishing the diameter of the orifice and of the outlet tube the following procedure is recommended. Having established the dimensions of the mixing receptacle and the length of outlet tube required to carry the mixture from the receptacle into the base of the centrifuge, an orifice is provided in the lower end of the outlet tube. Being so mounted the orifice will at all times be operating under a full head of liquid and the rate of flow will therefore be controlled by the size of the orifice and by the head. Under these conditions, the size of the orifice can be varied until the desired rate of flow out of the mixing receptacle is obtained. In this way it is possible to establish approximately the correct diameter of orifice, and the size of orifice having been so established the orifice is now moved from the lower end of the outlet tube to the upper end of the outlet tube. Two procedures are now available for determining the correct size of the outlet tube to be operated in conjunction with the size of the orifice so established. In one procedure an outlet tube of transparent material such as glass may be temporarily provided and tubes of varying diameter are substituted until with increasing diameter it is found that the tube will not carry a solid column of liquid but that the column will break and will at least partly displace the liquid in the tube, thereby reducing the hydrostatic head upon the orifice. The outlet tube to be adopted in practice should approach the maximum diameter at which a solid column of liquid is obtained under these conditions thereby insuring a uniform discharge of the mixture from the mixing receptacle into the centrifuge coupled with the maximum rate of discharge of the flush water hereinafter referred to. In the alternate procedure an outlet tube of metal may be used and tubes of varying diameter substituted until a diameter is reached at which the outflow from the mixing receptacle through the orifice is not uniform and sustained but pro contra falls off sharply with the reduction of liquid level in the mixing receptacle. Based on these observations the tube to be adopted and installed should approach the maximum diameter at which the rate of outflow from the mixing receptacle is a function of the total head within the mixing receptacle and the outlet tube and is therefore relatively unaffected by a reduction in liquid level within the mixing receptacle.

At the complete end of the operating cycle it has been found necessary to flush out receptacle 101 and at this time and for this purpose squirts of water are tangentially introduced (Figs. 5 and 13) by nozzles 118. These nozzles are bored in small turrets 119 spun into the inner surface of the side wall of receptacle 101. A detail view of one such nozzle is shown in Fig. 8. Flush water is carried to said nozzles by annular ring 120 set in the top of mixer 100 (Fig. 5) and the flush water is carried into ring 120 by tube 121 (Figs. 1 and 5). The means for the supply of flush water to tube 121 is described hereinbelow. During this stage of the operating cycle free discharge from receptacle 101 is desirable and this is accomplished by further lifting push rod 110 so that plug 107 is unseated and the liquid passes out of receptacle 101 through the full opening of discharge outlet 105 (Fig. 5).

Inasmuch as tramp material occasionally finds its way into the dispenser and since such tramp material might plug orifice 108 and thereby disturb the working of the machine, said orifice is surrounded by frustro-conical screen 122 (Fig. 5). This screen is of perforated metal, the perforations being approximately $\frac{3}{16}$ inch in diameter on ¼ inch centers. It operates to prevent tramp material finding its way to orifice 108 and also functions as a guide surface for plug 107.

The construction of the centrifugal separator and ancillary parts is shown in Figs. 5, 7, 10, 11 and 12. The centrifuge 123 (Fig. 5) preferably of chromium steel or stainless steel, comprises upper tubular section 124 which terminates in inwardly projecting overflow lip 125 and lower tubular section 126 of a diameter greater than section 124. The lower end 126 of centrifuge 123 is spanned by the annular closure 127 carrying the centrally located discharge tube 128. It has been found in practice that the larger particles in the coffee grind are quickly thrown out in the base of the centrifuge and tend to accumulate at this point, but that if the centrifuge is made uniformly large enough in diameter to accommodate this accumulation, the peripheral velocity of discharge from the overflow lip is so great as to introduce cloud into the beverage. By the special form of centrifuge shown in Fig. 5, the accumulation in the base of the centrifuge is provided for and any tendency to plug as the result of the use of too coarse a grind is obviated, while the upper tubular section 124 of the centrifuge is freed of the load of the coarser particles and a higher clarification efficiency is maintained with minimum peripheral velocity of discharge and minimum cloud. In practice, the centrifuge is started in rotation so that it comes to full speed before plug 109 lifts and orifice 108 is uncovered. Thereafter the mixture of grounds and extract runs at a uniform rate through mixer outlet 105 to tube 117 and is diverted horizontally from the lower end of tube 117 by spinning saucer 130.

Referring to Figs. 10, 11 and 12 for details of this saucer, it can be noted that the circumference of this saucer is provided with a series of vertical teeth 137. These teeth act as an impeller ring to increase the velocity with which the mixture of ground coffee and water issuing from outlet tube 117 is thrown horizontally into lower tubular portion 126 of centrifuge 123. In order to prevent coffee grounds from being retained in said saucer by the inner surfaces of said teeth, said surfaces are inclined downwards, preferably forming a continuation of the radial bevel of said saucer, and may in addition also be provided with lateral bevels as shown in the drawing (Figs. 11 and 12). Saucer 130 is carried by two posts 131 (Fig. 10) forming an upward extension of discharge tube 128, thus leaving a full opening for discharge purposes. The mixture undergoing separation accumulates in the centrifuge in tubular form. The thickness of this tubular body is determined by the inner edge of overflow lip 125. As stated, the larger particles are thrown out in lower tubular section 126 of centrifuge 123 and with continued introduction of fresh mixture the partially separated mixture is displaced upwardly into upper tubular section 124 of the centrifuge. The mixture introduced into the centrifuge may contain some froth and some particles which have associated air or gas bubbles. Such froth and particles might move up along the inner wall of the centrifugal column of liquid but are restrained from so doing by a series of, for instance, four baffles 135 provided in upper tubular section 124 of the centrifuge (Fig. 5). Referring to Figure 7 for a detail view of one of these baffles it is noted that they are peripherally cut away to form concentric slots 136 through which the mixture passes adjacent the inner wall of upper centrifuge section 124, and are provided with central opening 137 to clear rundown tube 117 (Fig. 5), but are otherwise imperforate so that material cannot flow telescopically up the centrifuge. The baffles are secured in position in any suitable manner. When centrifuge 123 is placed out of rotation (by means hereinafter to be described) the coffee grounds discharged by gravity into discharge tube 128 and thence into waste pipe 133 (Fig. 5). Waste pipe 133 is supported from base 1 by fitting 134 (Figs. 1 and 5). The centrifuge is driven by motor 192 through belt 139 (Fig. 1) and pulley 140 (Fig. 5).

Figure 15:
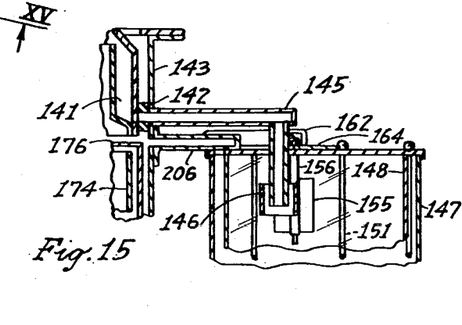
Fig. 15 is a partial sectional view along plane XV—XV of Fig. 13.

As mixture continues to flow into centrifuge 123 there is a continuous upward displacement of same into upper tubular portion 124 of the centrifuge and clarified beverage is thrown off from the top surface of overflow lip 125. It will be noted (Fig. 5) that the outer peripheral diameter of lip 125 is less than the bore of the upper portion 124 of the centrifuge, thereby reducing the peripheral velocity of discharge. The clarified beverage is caught in the annular trough formed by collector ring 141 (Fig. 5). This collector ring is provided with boss 142 by which it is secured to cylindrical casing 143. By reference to the partial view of collector ring 141 contained in Fig. 15, it will be noted that the beverage discharges from said collector ring through boss 142 into accumulator 144 by means of spout 145. This spout debouches into thimble 146, forming a hydrostatic seal, the function of which will be hereinafter considered.

Figure 14:
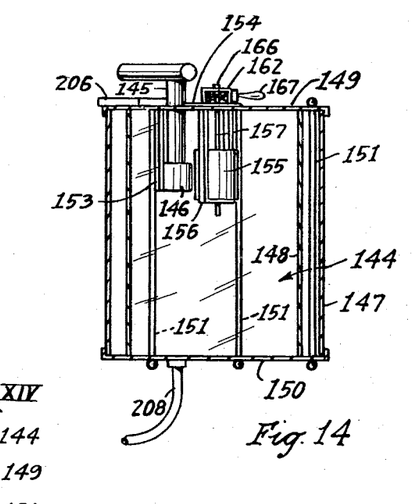
Fig. 14 is a partial sectional view along plane XIV—XIV of Fig. 13.

Accumulator 144 (Figs. 1, 2, 13, 14 and 15) comprises spaced concentric glass cylinders 147 and 148 (Fig. 14) closed by top and bottom end plates 149 and 150, respectively, held together by rods 151. Faucet 152 (Figs. 1, 2 and 13) is provided for drawing off the coffee beverage. Bracket 153 (Fig. 14) extends downwards from end plate 149 to support thimble 146. Cover plate 154 (Fig. 13) slidable parallel to top end plate 149 provides access to the accumulator for cleaning purposes. Float 155 vertically displaceable in housing 156 (Fig. 14) is responsive to the liquid level within said accumulator. This float is provided with vertical guide pin 157, rigidly attached thereto. The operation of this float can be more easily understood by referring to the partial cross-sectional view afforded by Fig. 16. When the level of coffee beverage in accumulator 144 drops below the predetermined level, float 155 and vertical guide pin 157 rigidly attached thereto (Fig. 14) move downwards and collar 158 (Fig. 16) borne by pin 157 (Figs. 13 and 16) presses down on end 159 of channel member 160 (Fig. 16) pivoted about pin 161 secured in housing 162. End 163 of said channel member is thus raised, closing microswitch 164 (Fig. 1) by means of chain 165 (Figs. 1 and 16), thus maintaining the electrical circuit of my machine closed, as will be described hereinafter below. When coffee beverage has accumulated up to the predetermined level in accumulator 144 float 155 rises, the pressure on end 163 of lever 160 is released and microswitch 164 is allowed to open. Cam 166 (Figs. 13 and 16) is arranged in housing 162 and provided with handle 167 to turn said cam to cause it to bear down on lever end 163, thus providing manual operating means for the control of microswitch 164 (Fig. 1).

Centrifuge 123 is journaled in bearing 169 (Fig. 5). This bearing defines annular space 170, closed by annular ring 168, into which space oil for lubrication is introduced through oil hole 171 connecting with force-feed lubrication line 172. The oil moves to the bearing surface through hole 173. Any oil thrown off from the upper surface of bearing 169 is deflected by apron 174 into annular trough 175, from which it discharges through port 176 onto shelf 177 secured to the side wall of the centrifuge and serving to deflect the oil into annular trough 178. Similarly any oil passing away from the lower surface of bearing 169 is likewise deflected by said shelf 177 into said annular trough 178. Overflow 181 communicating with said trough serves to return the oil via line 182 to the oil reservoir 357 (Fig. 1) to be hereinafter described. The downward thrust of the centrifuge is taken by collar 183 (Fig. 5) secured to the side wall of the centrifuge and riding on the upper surface of bearing 169. This collar also carries depending skirt 184, the purpose of which will be hereinafter described.

After the mixture formed in receptable 101 has all flowed into centrifuge 123, a batch of plain water at about the boiling point from tank 3 is delivered by valve 32 into receptacle 101 through spout 103. This water flows into centrifuge 123, thereby displacing any extract remaining therein at this time, and insuring that when the centrifuge is stopped, it will not contain beverage coffee and that there will not be a loss of yield as the result of beverage remaining in the centrifuge.

When these operations are concluded, centrifuge 123 is abruptly stopped by means of brake 307 (Fig. 1) to be hereinafter described. In this case the residue of grounds and water remaining in the centrifuge continues to rotate for a few seconds until its momentum has become dissipated. This scours and cleans the inner surface of centrifuge 123 and as soon as the momentum has been dissipated in this manner the mixture flows out of the centrifuge through discharge tube 128 and out of the apparatus through waste pipe 133.

As soon as this has taken place, jets of hot water are discharged against the inner walls of receptacle 101 and of centrifuge 123 thereby completing the cleaning operation.

The means for the accomplishment of this cleaning operation comprises coil 190 surrounding flue 21 in tank 3 (Figs. 1, 4 and 13) and branching off from water inlet pipe 10 below needle valve 13. The other end of coil 190 communicates via flush control valve 191 (Figs. 1, 2, 4, 5 and 13) with pipe 193. Pipe 193 communicates in turn with conduit 194 (Fig. 5) within casing 102 of mixer 100, which conduit terminates in chamber 197 concentrically arranged about mixer discharge outlet 105 and delivery tube 117. Flush tube 196 extends downwards from chamber 197, so as to provide an annular space concentrically surrounding rundown tube 117. This annular space is sealed off slightly above teeth 132 of saucer 130, and flush tube 196 is provided with a multiplicity of orifices 198 forming outlets for the flush water. Tube 121 providing flush water via nozzles 118 to receptacle 101, as described above, branches off from pipe 193. This tube is provided with U-bend 199 to provide a hydrostatic seal in said tube. Thus when flush control valve 191 (Figs. 1, 4 and 13) is actuated by means hereinafter to be described, water which has been heated in coil 190 to 100° C. and which is under the full pressure of the main water supply, for instance the municipal water system, discharges through orifices 198 and nozzles 118 (Fig. 5) thereby flushing out receptacle 101 and centrifuge 123 respectively.

As hereinbefore stated, burner 22 (Figs. 1 and 4) heating the water in tank 3 is so controlled, thermostatically, that some boiling is always taking place in the upper part of tank 3 with consequent generation and evolution of steam. This steam passes downwardly through vertical pipe 201 (Figs. 1, 2 and 13) and thence via horizontal pipe 202 into casing 102 (Figs. 2, 5 and 13). Some of the steam condenses to maintain receptacle 101, centrifuge 123, collector ring 141 and associated parts (Fig. 5) at 100° C. thereby insuring efficient operation regardless of the standby periods and also sterilizing centrifuge 123 and collector ring 141. One part of the excess steam moves downwardly through the bore of centrifuge 123 and out of the apparatus through discharge tube 128 and waste pipe 133 (Fig. 5). Any air that may have been originally in the centrifuge or carried into it from the mixture theretofore separated is thus displaced by steam, thereby eliminating cloud in the finished beverage which would otherwise result from air in the system. The steam is prevented from flowing into the centrifuge bearings by depending skirt 184 (Fig. 5), which operates as a hydrostatic seal, the water for this seal being supplied by the condensation effected at casings 102 and 143. Whenever centrifuge 123 is started this water is thrown out by centrifugal force and flows through drain 204 and conduit 205 to waste pipe 133. Another part of the excess steam passes via conduit 206 (Figs. 5 and 15) into the annular space defined by glass cylinders 147 and 148 of accumulator 144 (Fig. 15), thus providing a steam jacket for the coffee beverage contained within said accumulator. Condensate flows to waste pipe 133 through drain 208 (Fig. 14) and pipe 205 (Fig. 5). The hydrostatic seal provided by thimble 146 (Figs. 14 and 15) prevents steam passing into the central portion of accumulator 144 through spout 145.

Having described the constituent parts of the machine by which the beverage is produced I now describe the control or timer by which these constituent parts are operated in the correct temporal sequence. The timer 220 (Figs. 1 and 20–24) comprises pulley 221 driving, through three reduction gears (not shown in the drawing) contained in reduction gear housing 222, worm 223 which in turn drives gear 224 splined onto jackshaft 226. Pulley 221 is driven by V-belt 225 from motor 227 (Fig. 1). Referring to Figs. 20–24, jackshaft 226 carries seven cams by which the said temporal sequence is determined which cams will be hereinafter more particularly described. Said jackshaft 226 is journaled in holes bored in the uprights 228 and 229, which in turn are suspended from the underside of base 1 (Fig. 1). These uprights are mounted on reservoir cover plate 362, and are further laterally supported by cross-plates 216 and 217. Motor 221 is carried laterally by cross-member 230 secured to legs 2 (Fig. 1). Cam rider shaft 231 is likewise journaled in holes bored in uprights 228 and 229. Shaft 232 is secured in brackets 237 supported on vertical panel 233, this shaft serving as pivot for mercury switches 234 and 235 the purpose of which is hereinafter explained. Panel 233 is cut out to permit the pivoting of these switches. Trough 236 is supported by staybolts 218 and 219 secured between uprights 228 and 229. This trough (Figs. 1 and 20–24) functions to retain a bath of oil or grease into which the cams dip and which, therefore, provides them with adequate lubrication.

Jackshaft 226 is so geared to timer motor 227 that it and the cams carried thereby make a complete revolution in one cycle of the apparatus. The construction of the cams will be described by reference to one specific embodiment of the apparatus which has a cycle time of 90 seconds. In this specific embodiment, centrifuge 123 (Fig. 5) has an overall inside length of thirteen inches. The inside diameter of the base portion 126 is three inches, inside height of this portion two and three-sixteenths inches, inside diameter of upper portion 124 of the centrifuge one and one-half inches, inside diameter of the overflow lip 125 one inch. Rundown tube 117 is of $\frac{7}{16}$ inch bore and orifice 108 of plug 107 is of $\frac{7}{16}$ inch bore. This centrifuge is operated successfully at about 5000 R. P. M. with an output of five cups of finished beverage per cycle. The centrifuge may, of course, be operated at higher or lower speeds, if desired, and the output per cycle may be increased or decreased, depending upon the strength desired. With the cycle time and cycle output described, the amount of coffee introduced may be in the proportion of one pound of coffee to about 35 cups of finished beverage or about one pound of coffee to about 45 cups of finished beverage, or in any intermediate proportion.

Figure 20:
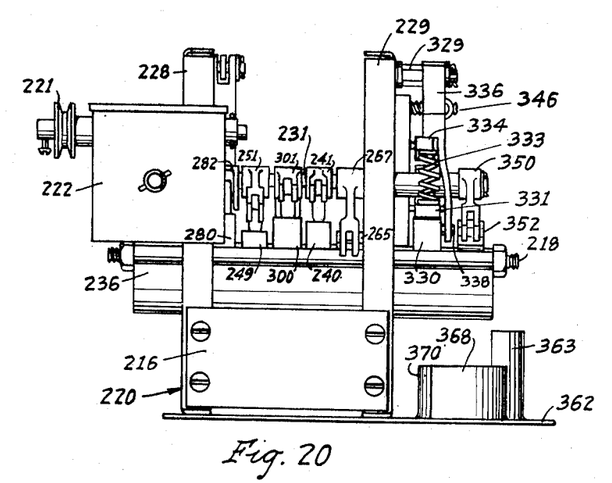
Fig. 20 is a rear view of the timing device according to my invention.
Figure 21:
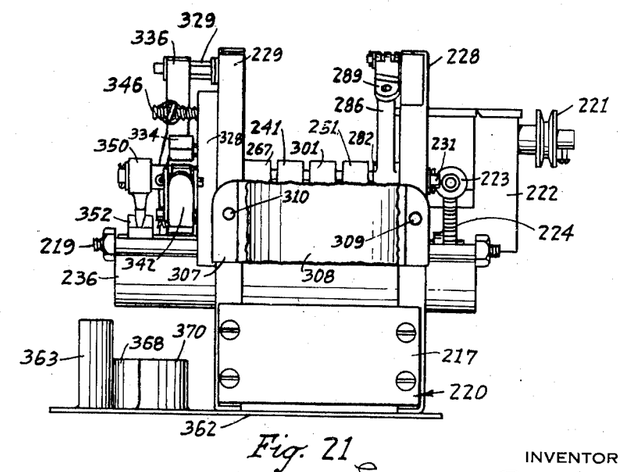
Fig. 21 is a front view thereof.
Figure 24:
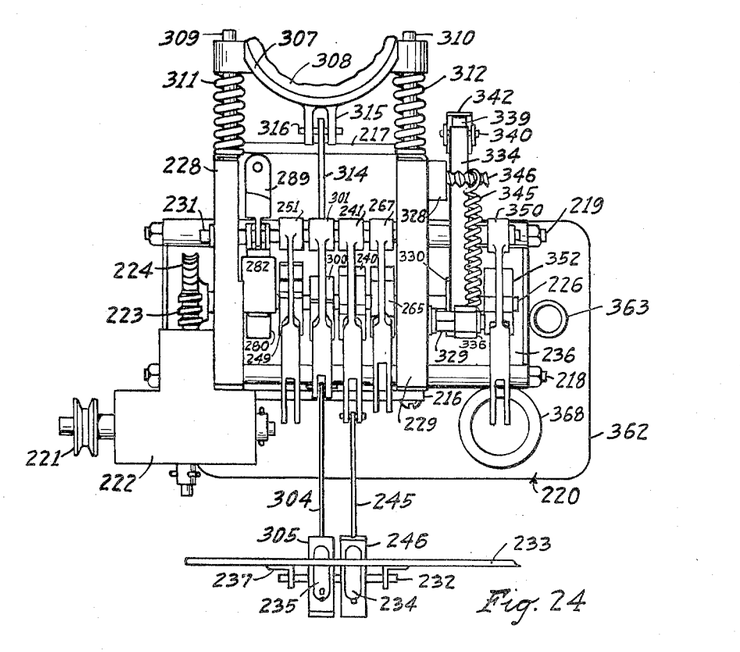
Fig. 24 is a plan view of the timing device of Figs. 20 to 23, showing in addition certain other details of construction.

We are now prepared to discuss the specific designs of the cams and cam riders whereby the requisite control is obtained. Referring to Figs. 20, 21, 24 and especially 35, the function of cam 240 is to maintain the precise cycle time of the apparatus and to insure that whenever started in operation, it will continue to operate until its full cycle is completed. Rider 241 is pivotally carried by shaft 231 while projection 243 rides on the surface 244 of cam 240. Rider 241 is connected through link 245 to rocker 246 pivotally carried by shaft 232. Rocker 246 carries mercury switch 234. By reference to Fig. 36 which is a diagram of the wiring circuit, it is seen that mercury switch 234 is in series with timer motor 227. Thus, whenever timer motor 227 is started in operation, as by the microswitch 164 controlled manually or by accumulator float 155, and hence projection 243 climbs from surface 242 onto surface 244, mercury switch 234 will be carried to the on-circuit position and motor 227 will continue in operation until the entire cycle has been completed and the cam rider 241 is returned again down onto surface 242 by the tension of spring 247. One end of said spring is connected to rocker 246 and the other end to panel 233. At this point if switch 164 (Figs. 1 and 36) is open, timer motor 227 and the apparatus come to a complete stop.

Figure 26:
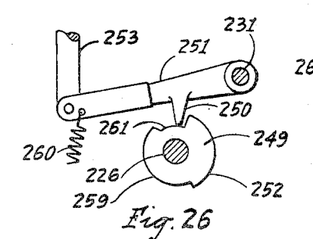

The next step in the operation of the apparatus is effected by cam 249 (Figs. 20–24). A detail view of this cam is shown in Fig. 26. This cam carried by jackshaft 226 controls the operation of the mixer outlet valve 105 shown in Figs. 5 and 9. When timer motor 227 is started projection 250 of rider 251 carried by shaft 231 climbs to the surface 252 of cam 249, thereby lifting push rod 253. This push rod is connected via link 254 (Fig. 1) pivoted on bracket 255 secured to base 1, with rod 248. Arm 256 extends horizontally from rod 248, its outer end being displaceable between collars 257 and 258 on push rod 110 (Fig. 1). Thus when push rod 253 is lifted, arm 256 is depressed and strikes collar 258, thereby pressing downwardly upon push rod 110 and seating plug 109 in orifice 108 (Fig. 5). Projection 250 will be about half-way up the inclined surface of cam 249 when projection 243 (Fig. 35) attains its full lift. This insures that the load on timer motor 227 will be staggered and that mixer outlet valve 105 will not be fully closed until the machine cycle has been definitely started. At the expiration of 42 seconds from the time of initial contact projection 250 runs off surface 252 (Fig. 26) onto surface 259 by reason of the pull exerted by spring 260 connected between rider 251 and oil reservoir cover plate 362. In this way pressure on collar 258 (Figs. 1 and 5) is relieved and orifice 108 is permitted to be opened by the upward pressure of spring 115 operating against collar 116 (Fig. 5). At 83 seconds after the time of initial contact, projection 250 runs off surface 259 (Fig. 26) onto surface 261. The further drop in push rod 253 causes arm 256 (Fig. 1) to contact with and lift collar 257, thereby lifting the entire valve assembly 107 off of seat 105 and making available the full discharge opening from the bottom of receptacle 101.

Figure 29:
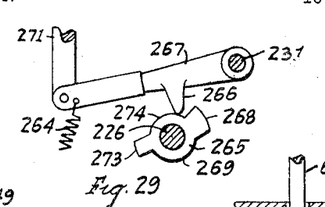

Returning to Figs. 20–24, the next cam in point of interest is 265. A detail view of this cam is shown in Fig. 29. This cam controls the operation of the mixer water inlet valve 32 shown in Fig. 1. When projection 250 (Fig. 26) has just attained its maximum lift, projection 266 (Fig. 29) of rider 267 carried by shaft 231, is about half-way up the surface 268 of cam 265. Projection 266 continues to ride on surface 268 until 20 seconds after the time of initial contact, whereupon projection 266 is returned to surface 269 by the pull exerted by spring 264. While projection 266 was in the elevated position, push rod 271 was lifted, thereby lifting connected yoke 272 (Fig. 1) and opening valve 32 (Fig. 13). In a machine of the specific capacity described, orifice 104 (Fig. 5) is so chosen that approximately five cups of water pass into receptacle 101 during the period that valve 32 is so opened. At the expiration of 20 seconds, valve 32 is closed by the return of push rod 271 and remains closed until 57 seconds after initial contact when projection 266 runs up onto surface 273 (Fig. 29) of cam 265. It continues to ride on this surface 273 until 67 seconds after the time of initial contact, whereupon projection 266 runs down onto surface 274 and valve 32 is again closed. From 2.5 to 3 cups of water will have entered receptacle 101 during this period.

Having described the means for closing the mixer outlet valve and for introducing the water, it is now in order to describe the means for introducing the ground coffee.

Figures 30, 31:
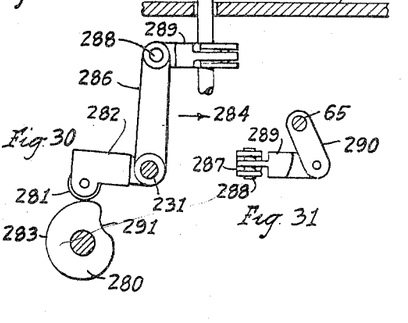

I have already described the dispenser (Figs. 1, 17 and 18) and how by a movement of rod 65 and bracket 64 in one direction the hub 49 was turned during one operating cycle and how by the reverse movement of rod 65 and bracket 64 at the commencement of a succeeding cycle the bottom closure plate 70 was moved horizontally to uncover dispenser discharge outlet 51, thereby dropping a batch of coffee into receptacle 101. These operations are controlled by cam 280 (Figs. 20–24). A detail view of this cam appears in Fig. 30. Roller 281 of rider 282 pivotally mounted on shaft 231 runs on surface 283 of cam 280. Rider 282 is provided with bell arm 286 the outer end of which is developed as yoke 287 (Fig. 31) to hold pin 288 on which double clevis 289 is pivoted. Shaft 65 extending through an orifice in base 1 (Figs. 1 and 30) and secured thereby against translational movement is pivotally connected to said clevis 289 by yoke arm 290 (Figs. 30 and 31). During the operation of the machine, roller 281 is progressively lifted by surface 283 thereby forcing link 289 in the direction indicated by arrow 284. The effect is to move arm 290 and rod 65 through an angle of about 60°. It is this movement which (Figs. 17 and 18) turns the hub 49 of the dispenser. The actual rotational movement of the wheel is only 45°; the overrun of 15° is desirable, however, to make certain that hooks 61 and 72 (Fig. 18) make proper engagement respectively with gear 59 and pin 71. At the expiration of a machine cycle, cam 280 and rider 282 are in the positions indicated in Fig. 30. When a machine cycle is started, roller 281 runs down surface 291 of cam 280. This obviously permits clevis 289 to move under the action of spring 285 (Fig. 1) (one end of which is connected to shaft 65 and the other to base 1) in the reverse direction to that indicated by arrow 284. The corresponding movement of rod 65 (Figs. 1, 17 and 18) operating through bracket 64 moves hook 61 to the position shown in Fig. 18, thereby opening bottom closure plate 70 and dropping a charge of coffee from the dispenser. This operation takes place after mixer outlet 105 (Fig. 5) has been fully closed and before the water from orifice 104 has been fully discharged so that the continued discharge of this water may operate to drive the coffee below the surface of the water accumulated in receptacle 101 and to insure complete mixing. As hereinbefore pointed out the movement of rod 65 caused by the progressive lift of roller 281 also operates to throw hook 72 out of engagement with pin 71 (Fig. 18), thereby permitting the pull exerted by spring 83 to close door 70.

Figure 22:
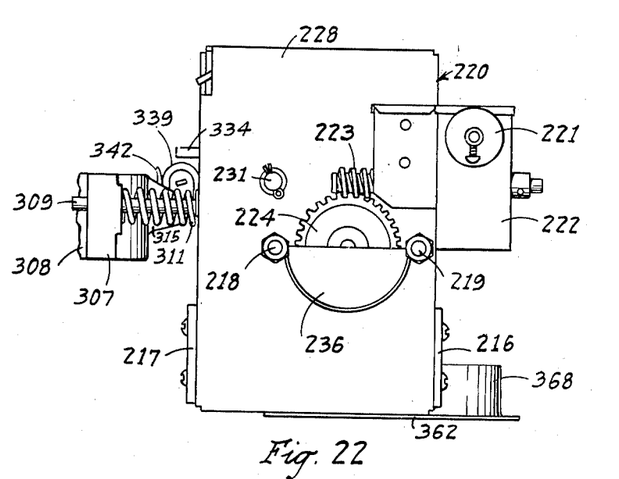
Fig. 22 is a right side view thereof.
Figure 23:
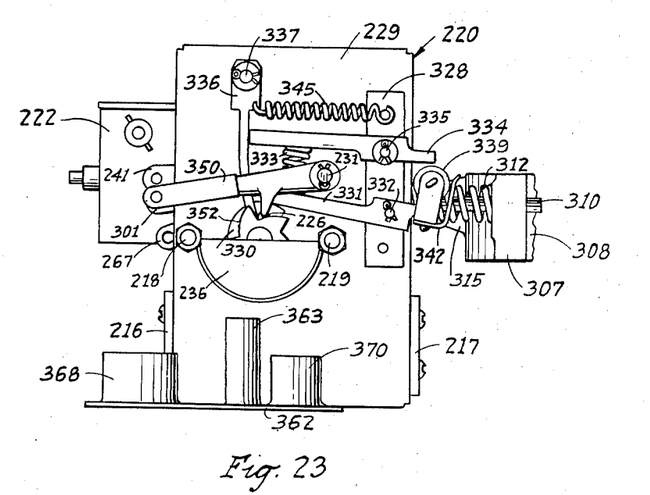
Fig. 23 is a left side view thereof.
Figures 28, 33:
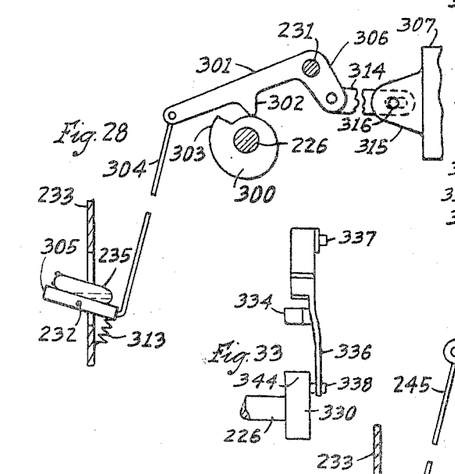

Cam 300 (Figs. 20–24), next to be considered, controls the operation of centrifuge motor 292. This motor operating through pulley 293 drives pulley 140 (Figs. 1 and 5) of centrifuge 123 via V-belt 139. For this purpose motor 292 is secured to leg 2 of base 1 (Fig. 1). Referring to Fig. 28, jackshaft 226 carries cam 300. Cam rider 301 pivotally mounted on rod 231 has projection 302 which rides on the surface of this cam. Rider 301 is connected through link 304 to rocker 305 pivotally carried by shaft 232. Rocker 305 carries mercury switch 235. As projection 302 rides up onto the elevated portion 303 of this surface, link 304 changes the angle of rocker 305, thereby throwing mercury switch 235 carried thereby to the on-position. As is evident from the wiring diagram of Fig. 36, this switch is in series with and controls centrifuge motor 292. To bell arm 306 (Fig. 28) of rider 301 there is pivoted link 314, the other end of which is pivoted about pin 316 provided in yoke 315 of brake drum 307 (Figs. 24 and 28). Before switch 235 reaches the on-position, link 314 is retracted, thereby pulling brake drum 307 and brake surface 308 away from engagement with the outside of lower section 126 of centrifuge 123 (Fig. 1). As shown in Figs. 22–24 brake drum 307 is slidably carried by rods 309 and 310 mounted in uprights 228 and 229. Springs 311 and 312 urge brake drum 307 toward lower section 126 of centrifuge 123 and as soon as projection 302 rides off of the elevated surface 303 these springs apply the brake and arrest the rotation of the centrifuge; simultaneously spring 313 connected between rocker 305 and panel 233 returns mercury switch 235 to the off-position, thereby killing centrifuge motor 292.

Figure 34:
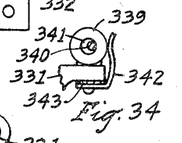
Fig. 34 is a detail view with certain parts removed of part of the showing of Fig. 32.

After centrifuge motor 292 and centrifuge 123 have stopped, sufficient time is allowed for the material remaining in the centrifuge to lose its rotational movement and run out of the device through discharge tube 128 and waste pipe 133 (Fig. 5). Shortly thereafter receptacle 101 and centrifuge 123 are flushed out through spray nozzles 118 and orifices 198 (Fig. 5) and for this purpose flush control valve 191 is actuated by pushing upwardly valve stem 192 (Fig. 1). To this end push rod 320 (Fig. 1) is forced upwardly so that collar 321 bourne by the end thereof is raised from its seat on top of sleeve 322 and actuates valve stem 192. The mechanism by which this is accomplished is shown in Figs. 32 and 33 in a detail showing of part of the construction of Figs. 1 and 20–24. Cam 330 mounted on shaft 226 defines a discontinued surface of progressively increasing radius. As the cam revolves, during the machine cycle, it progressively forces upward lever 331 pivotally connected to spacer 328 on the side of upright 229 (Figs. 21, 23 and 32) by pin 332. This upward movement compresses coil spring 333 positioned by retainers 346 and 347 against lever 334 which is also pivotally connected to said spacer 328 by pin 335. Attention is called to the fact that the pivot points of levers 331 and 334 do not lie in the same vertical plane (Fig. 32). Lever 334 cannot move upwardly because it is restrained by trigger 336 pivotally connected to spacer 329 on the side of upright 229 (Figs. 20 and 21) by pin 337. At the exact moment at which it is desired to actuate the flush valve, trigger 336 is forced off of the end of lever 334 by pin 338, thereby releasing lever 334 and actuating push rod 320. The angular divergence between levers 334 and 331 is, however, limited by roller 339 rotatably supported by pin 340 in oversize bore 341. Leaf spring 342 tends to hold roller 339 in the position shown in Fig. 34. Housing 343 carried by lever 331 supports pin 340 and spring 342. As soon as the end of lever 331 runs off of the elevated surface 344 of cam 330 both levers 331 and 334 drop and flush control valve 191 is thereby closed, and upon further rotation of cam 330 trigger 336 is reset by means of spring 345 attached between said trigger and stub 346. As the result of this construction the flush valve is either fully on or fully off, i. e., there is no intermediate period in which water is being discharged without a vigorous flushing effect and the total time the valve is open may be closely determined by adjustment.

Figure 27:
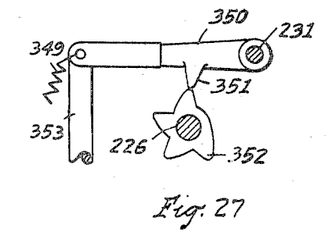

Next to be considered is the force-feed lubrication system for the centrifuge bearings. Referring to Fig. 27, cam rider 350 pivotally carried by shaft 231 has projection 351 which rides on the surface of cam 352, mounted on shaft 226. The rotational movement of cam 352 operating through link 353 alternately raises oil pump piston 354. The reverse movement of piston 354 is effected by spring 356. As can be noted from Fig. 27, there are four strokes of piston 354 during each machine cycle. These movements discharge oil from reservoir 357 through side outlet 360 and tube 172 (Fig. 1) into annular space 170 (Fig. 5) in the upper surface of centrifuge bearing 169. Oil returns to reservoir 357 from annular trough 179 (Fig. 5) through return line 182 (Fig. 1). Oil reservoir cover plate 362 is supported from base 1 by uprights 228 and 229 (Figs. 20–24), and reservoir 357 is suitably secured to the bottom of said cover plate.

Figure 25:
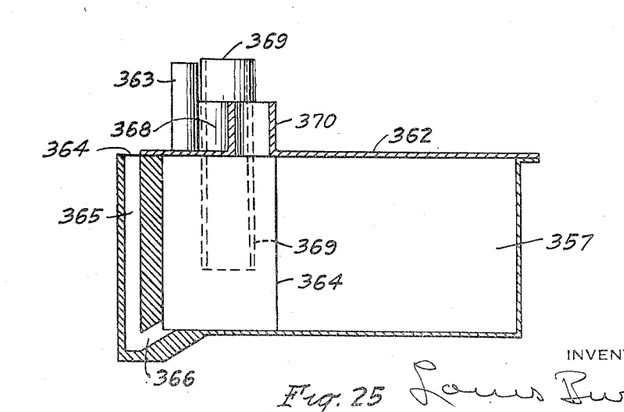
Fig. 25 is a vertical section along plane XXV—XXV of Fig. 1.

Referring to Fig. 25 for a longitudinal vertical section through oil reservoir 357 and cover plate 362, the reservoir may be periodically replenished through fill pipe 363. The reservoir is provided with a riser 365 which is connected by duct 366 with the main body of reservoir 357. If water finds its way into the oil reservoir, as, for example, the result of leakage, carelessness in cleaning, or possibly leakage of steam into the main bearings, the water accumulates in the lower part of reservoir 357 and the oil is thereby lifted into risers 368 and 370 until the compound head of the water and of the oil resting thereon counterbalances the hydrostatic head of a column of water in riser 365 extending up to outlet 364. Any further accumulation of water is then automatically rejected through outlet 364 without at any time interfering with normal bearing lubrication. Piston 354 reciprocates in liner 369 provided in pump block 371, said liner extending upwards through riser 368 (Fig. 25).

The cams illustrated are of suitable outline for a coffee maker operating on an overall 90 second cycle with a production of 5 cups of finished beverage per cycle. The following are the approximate times maintained by a timer carrying such cams and which times have been found entirely satisfactory.

| Seconds After Commencement of Cycle | |
|---|---|
| 0 | Mercury switch 234 and timer motor 227 on: Determined by projection 243 riding up onto surface 244 of cam 240 (Fig. 35). |
| 5 | (a) Mixer discharge outlet 105 closes: Determined by projection 250 riding up onto surface 252 of cam 249 (Fig. 26). (b) Mixer inlet valve 32 opens: Determined by projection 266 riding up onto elevated surface 268 of cam 265 (Fig. 29). |
| 8 | Dispenser outlet plate 70 opens: Determined by roller 281 running down surface 291 of cam 289 (Fig. 30). |
| 14 | Dispenser outlet plate 70 closes: Determined by roller 281 running onto surface 283 of cam 280 (Fig. 30). |
| 20 | Mixer inlet valve 32 closes: Determined by projection 266 riding down off elevated surface 268 onto surface 269 of cam 265 (Fig. 29). |
| 35 | Mercury switch 235 and centrifuge motor 292 on: Determined by projection 302 running up on elevated surface 303 of cam 300 (Fig. 28). |
| 42 | Mixer outlet orifice 108 (Fig. 9) opens: Determined by projection 250 running off of elevated surface 252 onto surface 259 of cam 249 (Fig. 26). |
| 57 | Mixer inlet valve 32 opens: Determined by projection 266 riding up onto elevated surface 273 of cam 265 (Fig. 29). |
| 67 | Mixer inlet valve 32 closes: Determined by projection 266 riding down onto surface 274 of cam 265 (Fig. 29). |
| 80 | Mercury switch 235 and centrifuge motor 292 off and brake 307 applied: Determined by projection 302 running off of elevated surface 303 of cam 300 (Fig. 28). |
| 83 | Mixer discharge outlet 105 opens: Determined by projection 250 running off of surface 259 onto surface 261 of cam 249 (Fig. 26). |
| 87 | Flush valve 191 opens: Determined by pin 338 of cam 330 releasing lever 334 from engagement with trigger 336 (Fig. 32). |
| 90 | (a) Flush valve 191 closes: Determined by lever 331 running down off of elevated surface 344 of cam 330 (Fig. 32). (b) Mercury switch 234 and timer motor 227 off: Determined by projection 243 running off of surface 244 down onto surface 242 of cam 240 (Fig. 35). |

The times for the actuation of oil pump 355 are not critical. It is, however, desirable to introduce the first slug of oil before centrifuge motor 292 is started.

Figure 36:
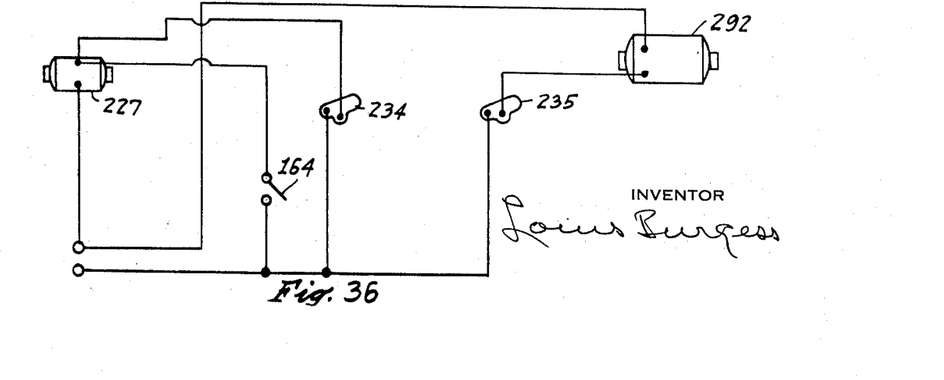
Fig. 36 is a wiring diagram for my machine.

The operation of my improved coffee maker will be evident from the foregoing description. As soon as the machine is up to temperature which will be evident from the appearance of steam at the waste pipe 133 (Fig. 5) thereby showing that the water in tank 3 is up to the boiling point and that the centrifuge is at a temperature of 100° C., the machine is ready to operate. The dispenser should be charged with ground coffee and for this purpose a relatively fine grind of the order of a corn-meal grind will be found satisfactory. The machine will continue to operate so long as the circuit controlling timer motor 227 is energized by float or manually controlled microswitch 184 (Fig. 36). The residue of coffee grounds rejected from waste pipe 133 may be discharged in any suitable manner. The preferred practice in this regard is to drop the effluent directly into a waste pipe communicating with the sewer.

The foregoing description is furnished by way of illustration and not of limitation, and it is, therefore, my intention that the invention be limited only by the appended claims or their equivalents wherein I have attempted to claim broadly all inherent novelty.

I claim:

1. In a coffee maker including a centrifuge of the imperforate overflow self-dumping type having an inwardly projecting overflow lip at the upper end thereof and a centrally positioned discharge outlet at the lower end thereof defining an opening of lesser inside diameter than said overflow lip, a receptacle, a rundown tube extending from said receptacle into said centrifuge, a dispenser surmounting said receptacle, a timer, means controlled by said timer for introducing a predetermined amount of water and means controlled by said timer for transferring a predetermined charge of ground roasted coffee from said dispenser into said receptacle, means for comingling said predetermined amount of water with said coffee in said receptacle to form a mixture, and means controlled by said timer for starting said centrifuge in rotation and for arresting the rotation of said centrifuge at a predetermined time, the improvement of means controlled by said timer for introducing a second predetermined amount of hot water into said receptacle following substantially the expiration of the time required for said mixture to run down into said centrifuge and during the time in which said centrifuge is in rotation.

2. The improvement according to claim 1 in which said second amount of water is at least substantially equal to the centrifugal volumetric capacity of said centrifuge.

3. The improvement according to claim 1 in which said second amount of water is at least substantially equal to the centrifugal volumetric capacity of said centrifuge and the time of introduction of said second amount of water is so coordinated with the rate of flow out of said receptacle through said rundown tube that a volume thereof at least substantially equal to the centrifugal volumetric capacity of said centrifuge passes downwardly through said rundown tube into the lower end of said centrifuge during the time in which said centrifuge is continued in rotation.

4. In a coffee maker including a centrifuge of the imperforate overflow self-dumping type having an inwardly projecting overflow lip at the upper end thereof and a centrally positioned discharge outlet at the lower end thereof defining an opening of lesser inside diameter than said overflow lip, a receptacle, a rundown tube extending from said receptacle into said centrifuge, a dispenser surmounting said receptacle, a timer, means controlled by said timer for introducing a predetermined amount of water and means controlled by said timer for transferring a predetermined charge of ground roasted coffee from said dispenser into said receptacle, means for comingling said predetermined amount of water with said coffee in said receptacle to form a mixture, and a valve operated by said timer controlling flow out of said receptacle through said rundown tube, and means controlled by said timer for starting said centrifuge in rotation and for arresting the rotation of said centrifuge at a predetermined time, the improvement of means controlled by said timer for introducing a second predetermined amount of hot water into said receptacle following substantially the expiration of the time required for said mixture to run down into said centrifuge and during the time in which said centrifuge is in rotation.

5. The improvement according to claim 4 in which said second amount of water is at least substantially equal to the centrifugal volumetric capacity of said centrifuge.

6. The improvement according to claim 4 in which said second amount of water is at least substantially equal to the centrifugal volumetric capacity of said centrifuge and the time of introduction of said second amount of water is so coordinated with the rate of flow out of said receptacle controlled by said valve that a volume thereof at least substantially equal to the centrifugal volumetric capacity of said centrifuge passes downwardly through said rundown tube into the lower end of said centrifuge during the time in which said centrifuge is continued in rotation.

LOUIS BURGESS.

REFERENCES CITED

The following references are of record in the file of this patent:

UNITED STATES PATENTS

| Number | Name | Date |
|---|---|---|
| 1,507,410 | Zorn | Sept. 2, 1924 |
| 1,665,728 | Conright | Apr. 10, 1928 |
| 1,709,657 | Clinton | Apr. 16, 1929 |
| 1,762,208 | Aborn | June 10, 1930 |
| 1,762,209 | Aborn | June 10, 1930 |
| 1,869,720 | Strand et al. | Aug. 2, 1932 |
| 1,980,931 | Rothermel | Nov. 13, 1934 |
| 2,149,270 | Burgess | Mar. 7, 1939 |
| 2,167,881 | Eberts et al. | Aug. 1, 1939 |